(12) United States Patent
Rule et al.

(10) Patent No.: US 11,664,684 B2
(45) Date of Patent: *May 30, 2023

(54) USING THE NFC FIELD FROM A PHONE TO POWER CARD TO PHONE BLUETOOTH COMMUNICATIONS

(71) Applicant: Capital One Services, LLC, McLean, VA (US)

(72) Inventors: Jeffrey Rule, Chevy Chase, MD (US); Kevin Osborn, Newton Highlands, MA (US); Daniel Herrington, New York, NY (US); William Carroll, Huntingtown, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,792

(22) Filed: Apr. 11, 2022

(65) Prior Publication Data
US 2022/0239156 A1 Jul. 28, 2022

Related U.S. Application Data

(63) Continuation of application No. 17/226,852, filed on Apr. 9, 2021, now Pat. No. 11,329,515, which is a
(Continued)

(51) Int. Cl.
*H02J 50/20* (2016.01)
*H04B 5/00* (2006.01)
(Continued)

(52) U.S. Cl.
CPC ............ *H02J 50/20* (2016.02); *H02J 7/0068* (2013.01); *H02J 50/001* (2020.01);
(Continued)

(58) Field of Classification Search
None
See application file for complete search history.

(56) References Cited

U.S. PATENT DOCUMENTS

| 8,559,872 B2 | 10/2013 | Butler |
| 8,620,218 B2 | 12/2013 | Awad |

(Continued)

FOREIGN PATENT DOCUMENTS

| EP | 3 644 255 | 4/2020 |

OTHER PUBLICATIONS

Author Unknown, Bluetooth NFC 13 Buttons QR Code Image E Ink Display Smart Card Product on Alibaba, Retrieved from Internet URL: https://www.alibaba.com/product-detail/Bluetooth-NFC-13-buttons-QR-code_60781703177.html?spm=a2700.7724857.normalList.5.30d449cfihqSqr&s=.

(Continued)

*Primary Examiner* — Kristy A Haupt
(74) *Attorney, Agent, or Firm* — Hunton Andrews Kurth LLP

(57) ABSTRACT

A contactless card with power harvesting unit is described. The power harvesting unit is configured to harvest power from near field communication radio wave fields and supply power to a memory, processor, and communication circuit of the contactless card. In some embodiments, the contactless card may also include a capacitor for smoothing out power deliver or a rechargeable battery. The contactless card is configured to establish two-way communication with a secondary device and to store and execute applets. In some embodiments, the contactless card is a payment card which contains information associated with a primary profile and a secondary profile. The secondary profile may be activated using two-way communication if the primary profile is deactivated due to fraudulent activity.

20 Claims, 8 Drawing Sheets

Related U.S. Application Data continuation of application No. 17/007,839, filed on Aug. 31, 2020, now Pat. No. 11,005,302.

(51) Int. Cl.
  *H04L 9/40* (2022.01)
  *H02J 50/00* (2016.01)
  *H02J 7/00* (2006.01)
  *H04W 12/06* (2021.01)

(52) U.S. Cl.
  CPC ....... *H04B 5/0037* (2013.01); *H04L 63/0853* (2013.01); *H04W 12/06* (2013.01)

(56) References Cited

U.S. PATENT DOCUMENTS

| | | | |
|---|---|---|---|
| 10,713,649 B1 | 7/2020 | Rule et al. | |
| 11,005,302 B1* | 5/2021 | Rule | G07F 15/006 |
| 11,329,515 B2* | 5/2022 | Rule | H02J 7/00045 |
| 2007/0197261 A1 | 8/2007 | Humbel | |
| 2008/0109309 A1 | 5/2008 | Landau et al. | |
| 2008/0270253 A1 | 10/2008 | Huang | |
| 2011/0218911 A1 | 9/2011 | Spodak | |
| 2012/0178366 A1 | 7/2012 | Levy et al. | |
| 2013/0005245 A1 | 1/2013 | Royston | |
| 2013/0065564 A1 | 3/2013 | Conner et al. | |
| 2013/0144793 A1 | 6/2013 | Royston | |
| 2014/0180851 A1 | 6/2014 | Fisher | |
| 2014/0256251 A1 | 9/2014 | Caceres et al. | |
| 2015/0220913 A1 | 8/2015 | Liu et al. | |
| 2018/0034507 A1 | 2/2018 | Wobak et al. | |

OTHER PUBLICATIONS

International Search Report and the Written Opinion of the International Searching Authority issued in related PCT Application No. PCT/US2021/046100 dated Dec. 3, 2021.

Notification Concerning Transmittal of International Preliminary Report on Patentability from related PCT Application No. PCT/US2021/046100, dated Mar. 9, 2023.

* cited by examiner

US 11,664,684 B2

USING THE NFC FIELD FROM A PHONE TO POWER CARD TO PHONE BLUETOOTH COMMUNICATIONS

CROSS-REFERENCE TO RELATED APPLICATIONS

This application is a continuation of U.S. patent application Ser. No. 17/226,852 filed Apr. 9, 2021, which is a continuation of U.S. patent application Ser. No. 17/007,839 filed Aug. 31, 2020, now U.S. Pat. No. 11,005,302, the disclosures of which are incorporated herein by reference in their entireties.

FIELD OF THE INVENTION

This disclosure relates to a contactless card configured to harvest power from radio signals and establish two-way communication with a device.

BACKGROUND

Communication using a contactless card is useful in many applications. The process of establishing contactless communication using a card may require the card to include a small battery as a power supply or may be limited to one-way communication. Additionally, several forms of wireless or contactless communication are limited to one-way communication and allow the communication to be picked up by third-party eavesdroppers.

Data security and transaction integrity are of critical importance to businesses and consumers. This need continues to grow as electronic transactions constitute an increasingly large share of commercial activity. The ability of a consumer to reliably use a financial card (e.g., credit cards and other payment cards) for commercial activity is an increasingly important. When fraud is detected related to a card or profile, that card is typically deactivated and a replacement card is delivered to the consumer. Activating replacement financial cards involves a time-consuming process of cardholders calling a telephone number or visiting a website and entering or otherwise providing card information.

Accordingly, there is a need to provide users with an appropriate solution that overcomes these deficiencies to provide data security, authentication, and verification for contactless cards. Further, there is a need for both an improved method of activating a card and an improved authentication for account access. What is needed is a contactless card configured to harvest power from radio waves and establish two-way communication with a client device.

SUMMARY

Therefore, it is an object of this disclosure to describe a contactless card which is able to harvest power from radio waves including from near-field communication (NFC) fields.

It is a further object of the invention to establish two-way communication between the disclosed contactless card and the client device. In some embodiments, the two-way communication includes communicating over Bluetooth or Bluetooth low energy signals.

It is a further object of the invention to utilize the two-way communication capabilities of the disclosed contactless card to increase functionality. In one exemplary aspect, the contactless card may be updated to a new, alternative, or secondary profile if fraud is detected on the primary profile.

Embodiments of the present disclosure relate to a contactless card comprising: a processor, a non-volatile memory, a communication circuit, and a power harvesting unit; wherein the power harvesting unit is electrically connected to the communication circuit and configured to harvest power from radio signals and wherein the communication circuit is configured to, upon receiving power from the power harvesting unit, establish two-way communication with a client device.

Embodiments of the present disclosure relate to a contactless card communication method, the method comprising the steps of providing a contactless card comprising a processor, a non-volatile memory containing one or more applets, a communication interface, and a power harvesting unit, wherein the power harvesting unit is configured to harvest power from a near field communication (NFC) field generated by a secondary device and wherein the communication interface is configured to transmit and receive radio signals. The contactless card detecting an NFC field generated by the secondary device wherein the secondary device comprises a radio antenna and a NFC field generator, and wherein the secondary device is in communication with a server. Harvesting power, by the contactless card, from the NFC field generated by the secondary device and establishing two-way communication between the contactless card and the secondary device.

Embodiments of the present disclosure relate to a two-way data transmission system comprising a contactless card comprising a processor, a non-volatile memory containing one or more applets, a communication interface, and a power harvesting unit, wherein the power harvesting unit is configured to harvest power from an NFC field generated by a mobile device, wherein the communication interface is configured to transmit and receive radio signals, wherein the contactless card is configured to detect the strength of an NFC field, and wherein, upon detecting that the NFC field generated by the mobile device is of at least a predetermined strength, the contactless card is configured to engage in two-way communication with the mobile device. The mobile device comprising a processor, an antenna, and an NFC field generator, wherein the mobile device is in communication with a server and configured to transmit information received from the server to the card.

DETAILED DESCRIPTION OF EXEMPLARY EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention By employing a contactless communication interface, contactless cards may be provided with a method to interact and communicate between a user's device (such as a phone) and the card itself. Example embodiments utilize Bluetooth signals for communication and utilize NFC fields as a source of power.

Figure 1:
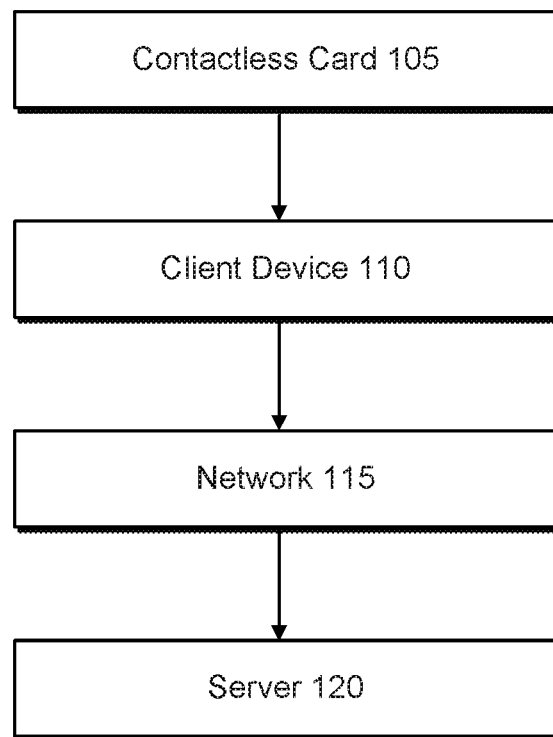
FIG. 1 illustrates an example embodiment of a contactless card communication system.

FIG. 1 illustrates an exemplary embodiment of a data transmission system utilizing a contactless card 105. System 100 may include contactless card 105, client device 110, network 115, and server 120. Although FIG. 1 illustrates single instances of the components, embodiments of the disclosed system 100 may include any number of components. In some examples, contactless card 105 may be in wireless communication, for example NFC or Bluetooth communication, with client device 110. Example embodiments of contactless cards are described with references to FIGS. 3-5.

In some embodiments, the disclosed systems may include a client device 110, which may be a network-enabled computer. As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client, a fat client, an Internet browser, a contactless card, or other device. The client device may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device.

In various examples according to the present disclosure, the client device may execute one or more applications, such as software applications, which enable, for example, the functionality described herein and network communications with one or more components of the disclosed systems and transmit and/or receive data.

The disclosed systems may include one or more networks 115. In some examples, the network may be one or more of a wireless network, a wired network or any combination of wireless network and wired network, and may be configured to connect a client device to a server. For example, a network may include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MIMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, a network may include, without limitation, telephone lines, fiber optics, IEEE Ethernet 902.3, a wide area network (WAN), a wireless personal area network, a local area network (LAN), or a global network such as the Internet. In addition, a network may support an Internet network, a wireless communication network, a cellular network, or the like, or any combination thereof. A network may further include one network, or any number of the exemplary types of networks mentioned above, operating as a stand-alone network or in cooperation with each other. A network may utilize one or more protocols of one or more network elements to which they are communicatively coupled. A network may translate to or from other protocols to one or more protocols of network devices.

The disclosed systems may include one or more servers 120. In some examples, one or more servers 120 may include one or more processors, which are coupled to one or more memories. One or more servers 120 may be configured as a central system, server or platform to control and call various data at different times to execute a plurality of workflow actions. One or more servers 120 may be configured to connect to the one or more databases. One or more servers 120 may be connected, directly or indirectly, to at least one client device.

Figure 2:
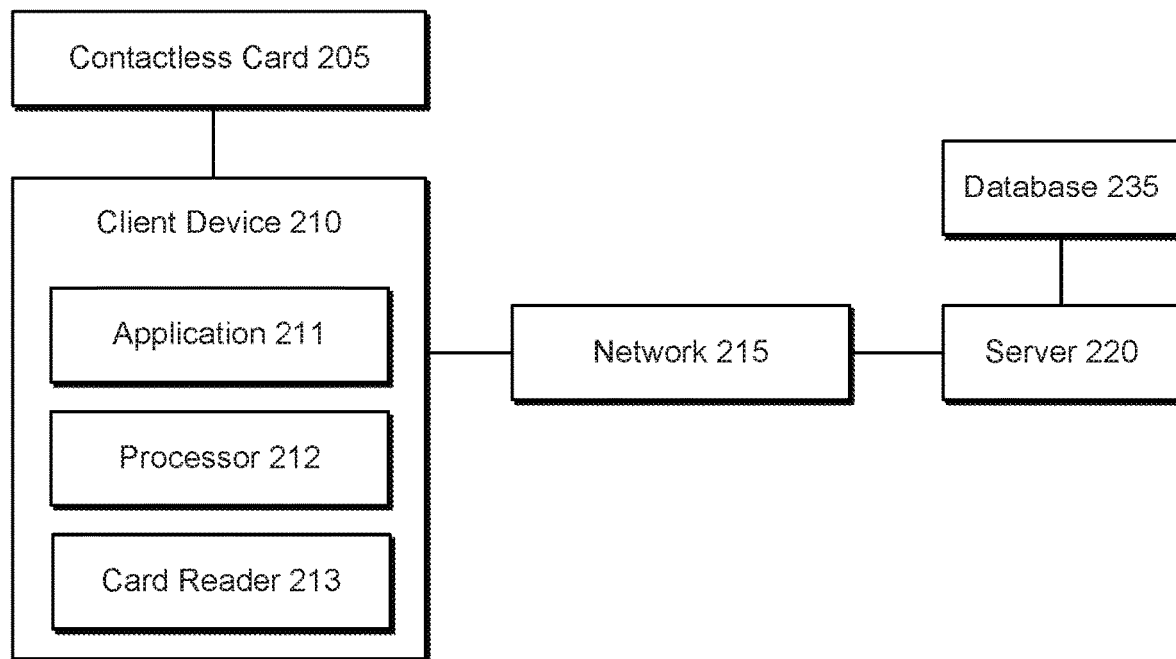
FIG. 2 illustrates an example embodiment of a contactless card communication system.

FIG. 2 illustrates a contactless card communication system 200. The communication system 200 and may include a contactless card 205, a client device 210, a network 215, a server 220, and a database 235. The contactless card 205, client device 210, network 215, and server 220 may be the same or similar to the corresponding elements illustrated in FIG. 1. Although network 215 is depicted as a single network in FIG. 2, it should be appreciated that according to one or more examples, network 215 may comprise a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211, and include one or more processors 212, and one or more card readers 213. For example, one or more applications 211, such as software applications, may be configured to enable, for example, network communications with one or more components of system 200 and transmit and/or receive data. Applications may include any software designed to perform a group of coordinate functions, activities, and/or tasks. Applications and may include, for example, one or more programs, applets, routines, and/or sub-routines.

Card reader 213 may be configured to read from and/or communicate with contactless card 205. In conjunction with the one or more applications 211, card reader 213 may communicate with contactless card 205. A card reader may include, for example, any data input device that reads data from a card including, but not limited to a barcode reader, magnetic strip reader, contact chip reader, and/or contactless reader, such as an NFC or Bluetooth communication interface. In some embodiments, a card reader may include a memory card reader, a magnetic card reader, and/or access card reader.

The application 211 of client device 210 may communicate with the contactless card 205 using short-range wireless communication (e.g., NFC). The application 211 may be configured to interface with a card reader 213 of client device 210 configured to communicate with a contactless card 205. In some embodiments, the application 211 communicates through an associated reader (e.g., card reader 213) with the contactless card 205.

As shown in FIG. 2, a contactless card 205 may be in communication with a client device 210 and client device 210 may be in communication with one or more servers 220 via one or more networks 215. In some embodiments, the client device 210 may operate as a respective front-end to back-end pair with a server 220. Client device 210 may transmit one or more requests to server 220. The requests may be generated by an application 211 executed by processor 212 of the client device 210.

The one or more requests may be associated with retrieving data from server 220 and or database 235. Server 220 may receive the one or more requests from client device 210. Based on the one or more requests from the client device 210, the server 220 may be configured to retrieve the requested data from one or more databases 235. Based on receipt of the requested data from the one or more databases, server 220 may be configured to transmit the received data to client device 210, the received data being responsive to one or more requests.

In some examples, contactless card 205 may be in wireless communication, for example Bluetooth communication, with client device 210. In some alternative embodiments, contactless card 205 may communicate with client device 210 through other techniques including, but not limited to, satellite, Wi-Fi, wired communications, and/or any combination of wireless and wired connections. According to some embodiments, contactless card 205 may be configured to communicate with card reader 213 of a client device 210 through Bluetooth or NFC signals when contactless card 205 is within range of card reader 213. In other examples, communications with contactless card 205 may be accomplished through a physical interface, e.g., a universal serial bus interface or a card swipe interface.

In some examples, the disclosed contactless card is a payment card, such as a credit card, debit card, or gift card. Information related to the issuer, card holder, associated vendor may be displayed on the front or back of the card. In some examples, the payment card may comprise a dual interface contactless payment card. In some embodiments, the contactless card is not related to a payment card, and may comprise, without limitation, an identification card, security card, loyalty card, smart card, and/or access card. The foregoing examples are non-limiting, and it is understood that the present disclosure includes the contactless cards of any function or type.

The contactless card may comprise a substrate, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card may have physical characteristics compliant with the ID-1 format of the ISO/IEC 7810 standard, and the contactless card may otherwise be compliant with the ISO/IEC 14443 standard. However, it is understood that the contactless card according to the present disclosure may have different characteristics, and the present disclosure does not require a contactless card to be implemented in a payment card.

Figure 3:
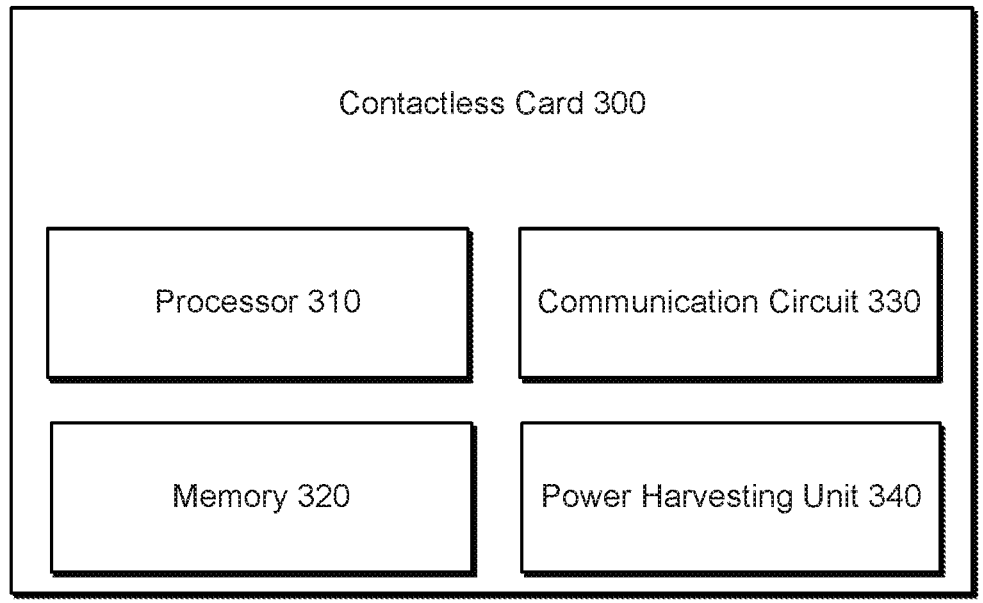
FIG. 3 illustrates an example embodiment of a contactless card.

FIG. 3 illustrates a contactless card 300 according to an example embodiment. The contactless card 300 may be the same or similar to the contactless card 205 illustrated in FIG. 2. The contactless card 300 may be in wireless communication with one or more client devices or one or more servers, and may contain a processor 310, a non-volatile memory 320, and communication circuit 330, and a power harvesting unit 340. While FIG. 3 illustrates single instances of these components, it is understood that the contactless card 300 may contain more than one instance of each component.

As shown in FIG. 3, the contactless card 300 may comprise a processor 310. The processor 310 may include processing circuitry and additional components, e.g., including processors, memories, error and parity/CRC checkers, data encoders, anticollision algorithms, controllers, command decoders, security primitives and tamperproofing hardware, as necessary to perform the functions described herein.

The non-volatile memory 320 may be a read-only memory, write-once read-multiple memory or read/write memory, e.g., ROM and EEPROM, and the contactless card may include one or more of these memories or combinations of these memories. A read-only memory may be factory programmable as read-only or one-time programmable. One-time programmability provides the opportunity to write once then read many times. A write once/read-multiple memory may be programmed at a point in time after the memory chip has left the factory. Once the write once memory is programmed, it may not be rewritten, but it may be read many times. A read/write memory may be programmed and re-programed many times after leaving the factory. It may also be read many times. The memory 320 may be configured to store one or more applets, one or more counters, and a customer identifier. The one or more applets may comprise one or more software applications configured to execute on one or more contactless cards, such as Java Card applet. However, it is understood that applets are not limited to Java Card applets, and instead may be any software application operable on contactless cards or other devices having limited memory. The one or more counters may comprise a numeric counter sufficient to store an integer. The customer identifier may comprise a unique alphanumeric identifier assigned to a user of the contactless card, and the identifier may distinguish the user of the contactless card from other contactless card users. In some examples, the customer identifier may identify a customer, an account, and/or a profile assigned to that customer and may further identify the contactless card associated with the customer, account, and/or profile.

The communication circuit 330 may establish two-way communication with the client device, or other device, such as a server. In some examples, the communication circuit 330 may establish two-way communication using Bluetooth signals, such as Bluetooth low energy signals. In some examples, the system may take advantage of the capacity of a Bluetooth low energy system to sleep and wake in an efficient manner In some examples, communication may be established using radio signals in the spectrum range of 2.400-2.4835 GHz. In some examples, the communication circuit 330 may use 1 or 2 MHz channels within a spectrum range. In some examples, the communication circuit 330 may use frequency hopping to reduce interference problems. In some examples, signals are sent using a power consumption of between 0.01 and 0.5 Watts. The communication circuit 330 is not limited to the use of Bluetooth, and it is understood that the communication circuit 330 may employ any known frequencies, methods, or techniques, including NFC radio-frequency identification, and other wireless communications methods.

The power harvesting unit 340 may be configured to harvest power from radio waves including, for example, the radio waves of a RFID and/or NFC field. The contactless card may be configured to draw power from the NFC field generated by a client device, therefore, some embodiments of the contactless card do not require a battery or other onboard power supply. These embodiments may achieve a reduction in card weight, a reduction in materials costs, a reduction in manufacturing costs, and a reduction in environmental impact.

In some embodiments, the power harvesting unit may comprise an inductive coil or antenna. The power harvesting unit may be electrically connected to the processor, memory, and communication circuit. In some embodiments, the contactless card may be positioned within the NFC field of a client device and the power harvesting unit may draw power from the NFC field. The power harvesting unit may then provide power to the processor and/or communication circuit in order to enable communication between the contactless card and a client or secondary device. In some embodiments, two power harvesting circuits may be utilized. A first power harvesting circuit may deliver power to a capacitor which is designed to rapidly charge and discharge. A second power harvesting circuit may deliver power to a capacitor which is designed to charge more slowly and can hold a charge for a longer period of time relative to the capacitor of the first power harvesting circuit. In some embodiments, the contactless card is preferably positioned in contact with a client device to harvest power more efficiently.

In some embodiments, a power harvesting unit comprises an NFC antenna. The NFC antenna may provide both communications and/or the inductance needed for power harvesting. In some embodiments, the power captured by the antenna of the power harvesting unit is alternating current at about, for example, 13.56 Mhz. In some embodiments, other frequencies, such as, for example, 125 kHz may be used. In some embodiments, the NFC antenna may comprise a LC filter and/or a matching circuit. The LC filter may act as a low pass filter that removes the high-frequency components from the signal output by the IC. It will be appreciated that the removed high-frequency components may be unnecessary for communication signals. The disclosed matching circuit may be a part of the antennae that is matched to the incoming magnetic field to produce inductance. The energy harvested from the induced electrical current may be passed to a power management unit and/or processor. In some embodiments, the induced voltage is about 0.1 volts. In many embodiments, the harvested power is sufficient to power Bluetooth Low Energy (LE) signals. If the harvested power is determined to be insufficient to power the desired communication signals, in some embodiments, the voltage may be increased using a transformer with additional turns of a coil or an increased permanent magnetic field. In some embodiments, the NFC antennae can be used to power a NFC IC chip directly or the power can be captured to power a Bluetooth LE single chip device.

In some embodiments the processor may regulate, control, and/or limit the amount of power provided to the communication circuit. By limiting the power provided to the communication circuit, the processor may limit the strength of any signals transmitted by the communication circuit and the range of such signals. As the contactless card may be positioned in close proximity to the client device, such as, for example in contact with the client device, the range of signals from the communication circuit required to establish communication with the client device is short. In some embodiments, the signal range may be limited to less than about 5 centimeter, or less than about 10 centimeters, or less than about 20 centimeters, or less than about 40 centimeters. In some embodiments, the signal range may be adjusted to at least about 5 centimeter, or at least about 10 centimeters, or at least about 20 centimeters, or at least about 40 centimeters.

In an exemplary embodiment, the contactless card may be placed in contact with a client device, such as, for example, an iPhone or Android phone. The contactless card and power harvesting unit may be configured to harvest about 1 volt of power from the NFC field generated by the iPhone. In some embodiments, the contactless card and power harvesting unit may be configured to harvest about between about 0.1 and about 2.5 volts of power from the NFC field. It will be appreciated that the power harvested by the power harvesting unit may also be converted to a desired voltage using known techniques. The power may be used to transmit and receive Bluetooth LE signals between the contactless card and the client device. Establishing two way communication between a contactless card and client device allows for increased functionality of the contactless card as discussed herein. It will be appreciated that the NFC field associated with some client devices may be stronger on the front or back of the device. For example, if the contactless card is used with some models of iPhone®, the contactless card may be more effectively charged when placed in contact with the front glass of the iPhone®. If the contactless card is used with some models of Android® phone, the contactless card may be more effectively charged when placed in contact with the back of the phone. In either case, the power harvesting unit of the contactless card is able to harvest power from an NFC field without a plug or other physical connection.

Figure 4A:
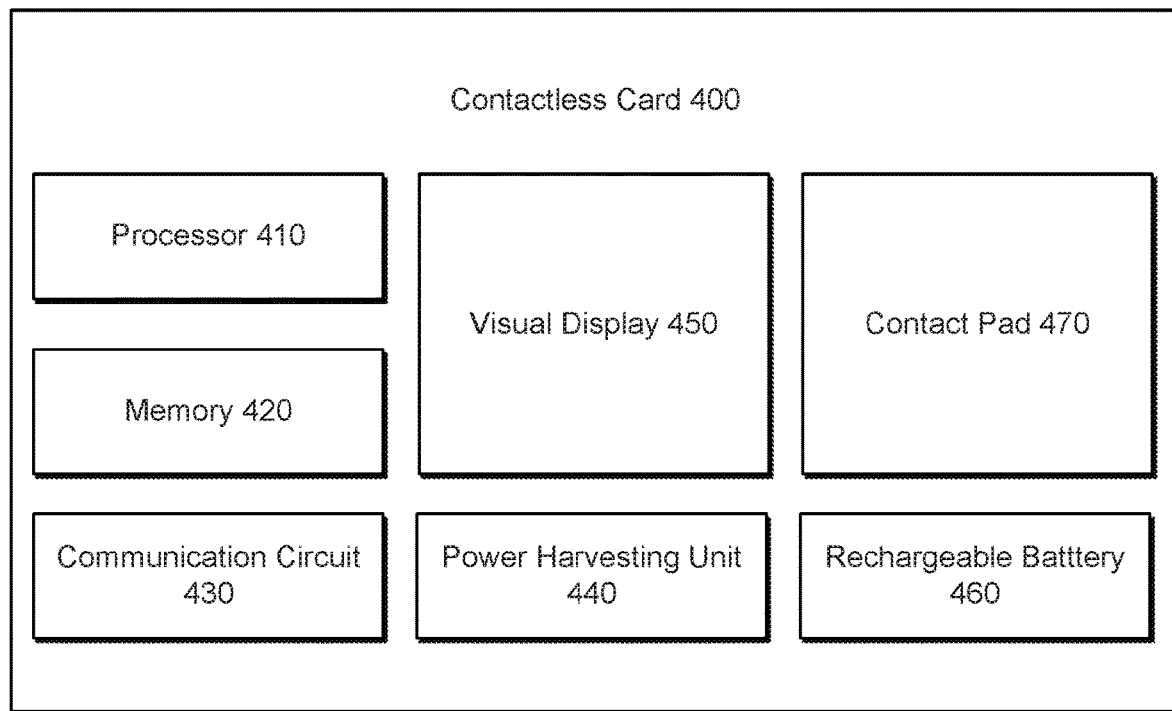
FIG. 4A illustrates an example embodiment of a contactless card with a visual display and a rechargeable battery.

FIG. 4A illustrates a contactless card 400 having a visual display and a rechargeable battery. As shown in FIG. 4A, the contactless card 400 may include a processor 410, memory 420, communication circuit 430, and power harvesting unit 440, which may be the same or similar to the corresponding components illustrated in FIG. 3. The contactless card may also include a magnetic strip or tape, which may be located on the back of the card (not shown in FIG. 4A).

As further shown in FIG. 4A, contactless card 400 may include a visual display 450, rechargeable battery 460, and/or contact pad 470. The visual display 450 may be any form of display that presents visual information to the user including, but not limited to e-paper, e-ink, LCD display, LED indicators, and/or an LED display. The visual display may be in data communication with the processor and configured to provide information to the user over many applications. In some embodiments, the visual display may be configured to inform the user when the card has entered or been removed from the NFC field of a secondary device. In some embodiments, the visual display may display a card number, expiration date, user name, and/or other information associated with a financial card.

The rechargeable battery 460 may be a nickel cadmium battery, a nickel metal hydride battery, a lithium ion battery, a lead acid battery, or other type of battery. The rechargeable battery may be electrically connected to the power harvesting unit 440 and the processor 410. The rechargeable battery 460 may supply power to the processor 410, memory 420, communication circuit 430, and other components when the card is not positioned within an NFC field. In some embodiments, the operation of the rechargeable battery 460 allows increased functionality of these components and of the contactless card 400, as well as the use of other components, e.g., other forms of memory, such as volatile memory.

Figure 4B:
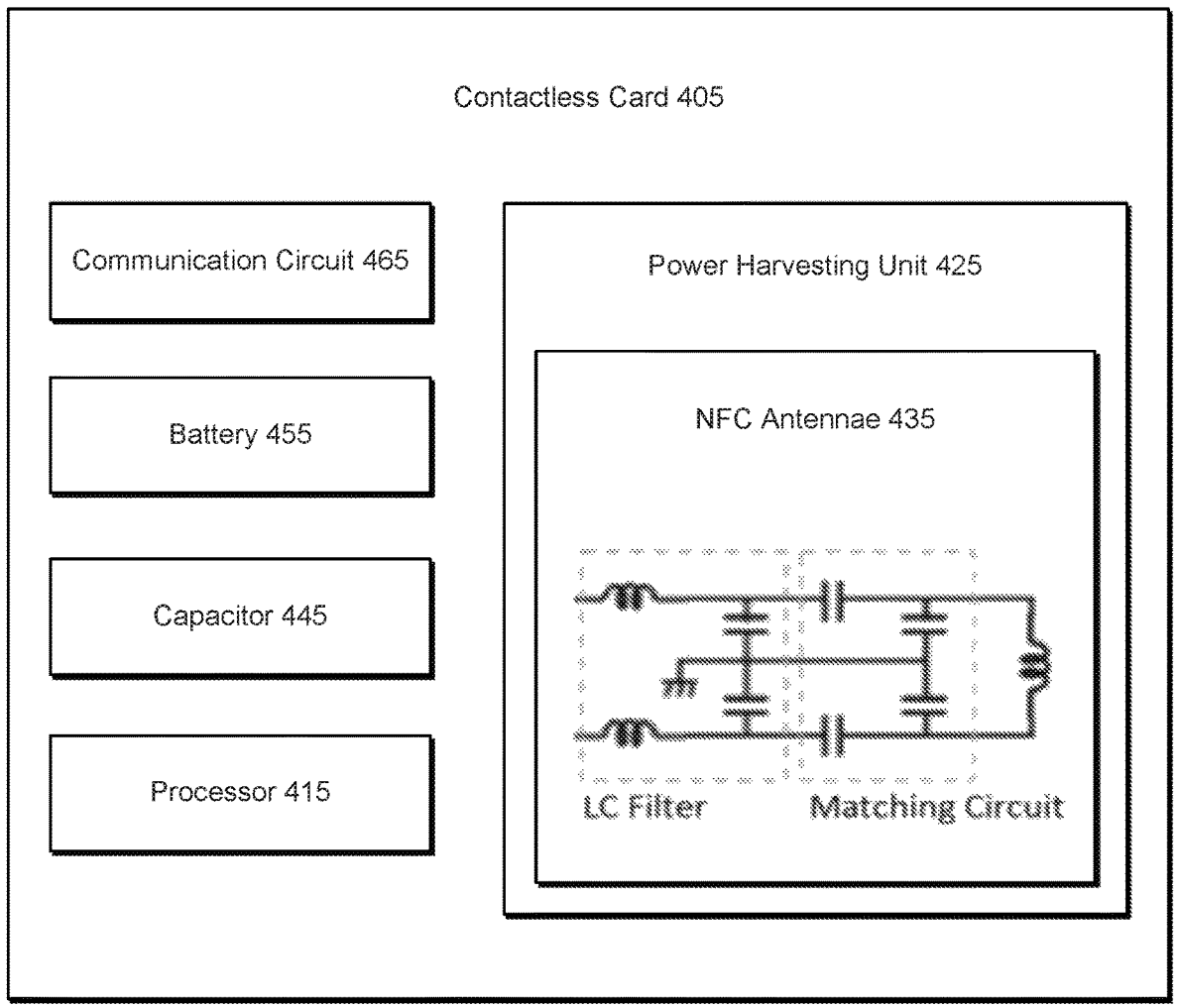
FIG. 4B illustrates an example embodiment of a contactless card with a power harvesting unit comprising an NFC antennae.

FIG. 4B illustrates an example embodiment of the contactless card 405 with a power harvesting 425 unit comprising a NFC antennae 435. The power harvesting unit 425 being operably connected to processor 415, capacitor 445, battery 455, and/or communications circuit 465. In some embodiments, the power harvesting unit 425 may be operably connected to the processor 415 which is, in turn, operably connected to capacitor 445, battery 455, and/or communication circuit 465.

In some examples, the contactless card may not include a rechargeable battery. In these examples, the contactless card will have limited or no access to a significant or continuous power source when it is not positioned within an alternating electromagnetic field such as, for example, a NFC field. In such embodiments, a non-volatile memory allows data to be stored and maintain a consistent state while the card is unpowered.

Figure 5:
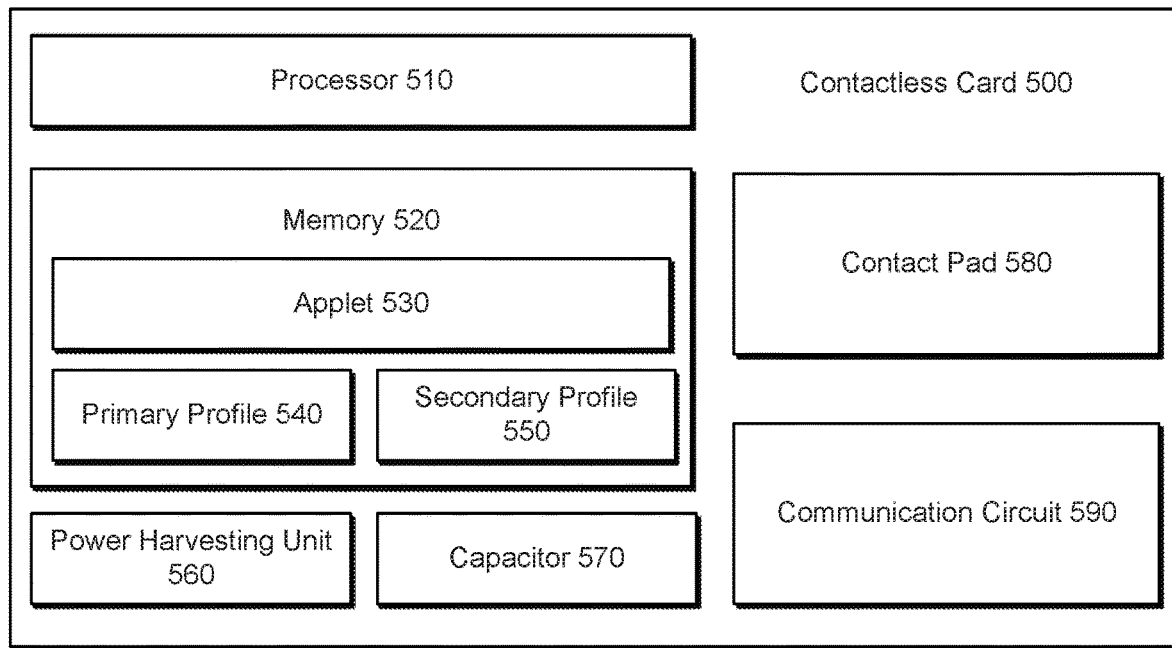
FIG. 5 illustrates an example embodiment of a contactless card with a memory containing an applet, primary profile, and secondary profile.

FIG. 5 depicts another example embodiment of a contactless card 500. As shown in FIG. 5, contactless card 500 may comprise a processor 510, memory 520, power harvesting unit 560, capacitor 570, contact pad 580, and a communication circuit 590. The processor 510, memory 520, power harvesting unit 560, and communication circuit 590 may be the same or similar as the corresponding components illustrated in FIGS. 3 and 4.

In some examples, the memory 520 may be configured to store or contain one or more applets 530, a primary profile 540, secondary profile 550, one or more counters, and a customer identifier.

The one or more applets 530 may comprise one or more software applications configured to execute on one or more contactless cards, such as Java Card applet. However, it is understood that applets are not limited to Java Card applets, and instead may be any software application operable on contactless cards or other devices having limited memory. The one or more counters may comprise a numeric counter sufficient to store an integer. The customer identifier may comprise a unique alphanumeric identifier assigned to a user of the contactless card, and the identifier may distinguish the user of the contactless card from other contactless card users. In some examples, the customer identifier may identify a customer, an account, and/or a profile assigned to that customer and may further identify the contactless card associated with the customer, account, and/or profile.

In some examples, a card may contain information associated with both a primary profile 540 and a secondary profile 550. The primary profile associated with a user may contain information such as, for example, an account number, associated user name, expiration date, and/or card verification value. This information may be presented visually on the card itself, be embossed on the card, be displayed by a visual display, be encoded on a magnetic strip, and/or be stored in the memory of the card. It will be understood that the primary profile information may be the information which is typically communicated when a user utilizes a card. In some examples, a secondary profile may contain alternative information analogous to the information contained in the primary profile including, for example, account number, user name, expiration date, and/or card verification value. In some examples the secondary profile may be activated if the primary profile or an account associated with the primary profile is determined to be associated with fraudulent activity. If fraudulent activity associated with the primary profile is detected, the primary profile may be quickly deactivated, thereby preventing additional fraudulent transactions, and the secondary profile may be activated, thereby allowing a user to continue using the card with little to no interruption.

In some embodiments, a card may initially contain a primary profile only but may be provided with an alternative or secondary profile by securing communicating account information to the card using the communication techniques described herein. In such embodiments, a single physical card may be updated with numerous profiles over the life of the card.

As shown in FIG. 5, some embodiments the contactless card comprises a capacitor 570 which allows for short term energy storage, thereby allowing the contactless card to remain in a powered state for a short duration while the NFC field of the client device is turned off. Cycling the NFC field on an off may occur during communication between a client device and the contactless card. A capacitor allows the contactless card to buffer the power harvested from the NFC field and maintain operations during fluctuations in the NFC field of the client device.

In some examples, the contactless card may also include identification information displayed on the front and/or back of the card, and/or a contact pad. The contact pad may be configured to establish contact with another communication device, such as a user device, smart phone, laptop, desktop, or tablet computer.

In some examples, a client device may execute one or more applications, and include one or more processors, and one or more card readers. For example, one or more applications, such as software applications, may be configured to enable, for example, network communications with one or more components of a system and transmit and/or receive data. A card reader may be configured to read from and/or communicate with a contactless card. In some examples, an application communicates through an associated reader (e.g., card reader) with the contactless card.

The application of any of client device may communicate with the contactless card using short-range wireless communication (e.g., Bluetooth, Bluetooth LE, and/or NFC). The application may be configured to interface with a card reader of client device configured to communicate with a contactless card. As should be noted, those skilled in the art would understand that a distance of less than twenty centimeters is consistent with NFC range. Bluetooth signals may be limited to a range of about twenty centimeters or less by adjusting the power output associated with the communication circuit and/or Bluetooth transmitter.

The contactless cards may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, from a reader, such as a mobile NFC reader, and produce an NDEF message that comprises a cryptographically secure OTP encoded as an NDEF text tag.

In some embodiments, key diversification may be employed for authentication and the exchange of data. For example, the contactless card and the client device (e.g., a phone or a server in data communication with the contactless card via one or more intermediary devices) may be provisioned with the same master symmetric key, although it is understood that any party or device holding the same secret symmetric key may perform these functions. In some examples, the symmetric key may comprise the shared secret symmetric key which is kept secret from all parties other than the contactless card and the client device involved in exchanging the secure data. It is further understood that both the contactless card and client device may be provided with the same master symmetric key, and further that part of the data exchanged between the contactless card and client device comprises at least a portion of data which may be referred to as the counter. The counter may comprise a number that changes each time data is exchanged between the contactless card and the client device.

When the contactless card is preparing to process the sensitive data with a symmetric cryptographic operation, the counter may be updated. In addition, the contactless card may select an appropriate symmetric cryptographic algorithm, which may include at least one of a symmetric encryption algorithm, a hash-based message authentication code (HMAC) algorithm, and a cipher-based message authentication code (CMAC) algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm, such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

The contactless card may take the selected cryptographic algorithm, and using the master symmetric key, process the counter. For example, the contactless card may select a symmetric encryption algorithm, and use a counter which updates with every conversation between the contactless card and the client device.

The contactless card may then encrypt the counter with the selected symmetric encryption algorithm using the master symmetric key, creating a diversified symmetric key. The diversified symmetric key may be used to process the sensitive data before transmitting the result to the client device. For example, the contactless card may encrypt the sensitive data using a symmetric encryption algorithm using the diversified symmetric key, with the output comprising the protected encrypted data. The contactless card may then transmit the protected encrypted data, along with the counter, to the client device for processing. In some examples, a cryptographic operation other than encryption may be performed, and a plurality of cryptographic operations may be performed using the diversified symmetric keys prior to transmittal of the protected data.

In some examples, the counter may not be encrypted. In these examples, the counter may be transmitted between the contactless card and the client device without encryption.

In some examples, sensitive data may be protected using one or more cryptographic algorithms and the diversified keys. The diversified session keys, which may be created by the key diversification which uses the counter, may be used with one or more cryptographic algorithms to protect the sensitive data. For example, data may be processed by a message authentication code (MAC) using a first diversified session key, and the resulting output may be encrypted using the second diversified session key producing the protected data.

In some examples, the client device may perform the same symmetric encryptions using the counter as input to the encryptions and the master symmetric keys as the keys for the encryption. The output of the encryptions may be the same diversified symmetric key values that were created by the sender. For example, the client device may independently create its own copies of the first and second diversified session keys using the counter. Then, the client device may decrypt the protected data using the second diversified session key to reveal the output of the MAC created by the contactless card. The client device may then process the resultant data through the MAC operation using the first diversified session key.

In some examples, the client device may use the diversified keys with one or more cryptographic algorithms to validate the protected data.

In some examples, the original data may be validated. If the output of the MAC operation (via the client device using the first diversified session key) matches the MAC output revealed by decryption, then the data may be deemed valid.

The next time sensitive data needs to be sent from the contactless card to the client device, a different counter may be selected, which produces a different diversified symmetric key. By processing the counter with the master symmetric key and same symmetric cryptographic algorithm, both the contactless card and client device may independently produce the same diversified symmetric key. This diversified symmetric key, not the master symmetric key, is used to protect the sensitive data.

In some examples, both the contactless card and client device each initially possess the shared master symmetric key. The shared master symmetric key may not used to encrypt the original sensitive data. Because the diversified symmetric key may be independently created by both the contactless card and client device, it is never transmitted between the two parties. Thus, an attacker cannot intercept the diversified symmetric key and the attacker never sees any data which was processed with the master symmetric key. Only the small counter is processed with the master symmetric key, not the sensitive data. As a result, reduced side-channel data about the master symmetric key is revealed. Moreover, the sender and the recipient may agree, for example by prior arrangement or other means, how often to create a new diversification value, and therefore a new diversified symmetric key. In an embodiment, a new diversification value and therefore a new diversified symmetric key may be created for every exchange between the contactless card and client device.

For example, the key diversification value may comprise the counter. Other non-limiting examples of the key diversification value include: a random nonce generated each time a new diversified key is needed, the random nonce sent from the contactless card to the client device; the full value of a counter sent from the contactless card and the client device; a portion of a counter sent from the contactless card and the client device; a counter independently maintained by the contactless card and the client device, which may or may not be sent between the two; a one-time-passcode exchanged between the contactless card and the client device; cryptographic hash of the sensitive data. In some examples, one or more portions of the key diversification value may be used by the parties to create multiple diversified keys. For example, a counter may be used as the key diversification value.

In another example, a portion of the counter may be used as the key diversification value. If multiple master key values are shared between the parties, the multiple diversified key values may be obtained by the system and processes described herein. A new diversification value, and therefore a new diversified symmetric key, may be created as often as needed. In the most secure case, a new diversification value may be created for each exchange of sensitive data between the contactless card and the client device. In effect, this may create a one-time use key, such as a single session key.

In other examples, such as to limit the number of times of use of the master symmetric key, it may be agreed upon by the sender of contactless card and recipient of the client device that a new diversification value, and therefore a new diversified symmetric key, will happen only periodically. In one example, this may be after a pre-determined number of uses, such as every 10 transmissions between the contactless card and the client device. In another example, this may be after a certain time period, a certain time period after a transmission, or on a periodic basis (e.g., daily at a designated time; weekly at a designated time on a designated day). In another example, this may be every time the client device signals to the contactless card that it desires to change the key on the next communication. This may be controlled on policy and may be varied due to, for example, the current risk level perceived by the recipient of the client device.

In some embodiments, card activation may occur without user authentication. For example, a contactless card may communicate with the application through the card reader of the client device through Bluetooth signals. The communication (e.g., a gesture of the card proximate the card reader of the client device) allows the application to read the data associated with the card and perform an activation. In some cases, the communication may activate or launch an application and then initiate one or more actions. In some cases, if the application is not installed on a client device, a gesture of the card proximate the card reader may initiate a download of the application (e.g., navigation to an application download page). Subsequent to installation, a gesture of the card may activate or launch the application, and then initiate (e.g., via the application or other back-end communication) activation of the card. In some embodiments, after activation, the card may be used in various transactions including commercial transactions.

According to some embodiments, the contactless card is a virtual payment card. In those embodiments, the application may retrieve information associated with the contactless card by accessing a digital wallet implemented on the client device or implemented on a server in communication with the client device, wherein the digital wallet includes the virtual payment card.

A server may comprise a web server in communication with a database. A server may comprise an account server. In some embodiments, a server may be configured to validate one or more credentials from the contactless card and/or the client device by comparison with one or more credentials in the database. In some embodiments, a server may be configured to authorize one or more requests, such as payment and transaction, from a contactless card and/or client device.

In some embodiments, the contactless card is a payment card associated with a primary profile. In such embodiments, the contactless card may comprise information associated with the primary profile including, but not limited to, account number, user name, expiration date, and/or card verification value. This information may be presented visually on the card itself, be embossed on the card, be displayed by a visual display, be encoded on a magnetic strip, and/or be stored in the memory of the card.

When fraudulent activity associated with a profile is detected, the profile is typically deactivated in order to prevent further fraudulent activity. At that point, the user is unable to use a payment card until a financial institution prepares a new payment card and physically sends it to the user. This may interrupt the user's activities for a period of time and reduce the total transaction volume of the card issuer for the period of time the user is unable to use the payment card.

In some examples, such as the contactless card shown in FIG. 5, the disclosed contactless card may comprise information associated with a secondary profile in addition to a primary profile. The secondary profile may be dormant until activated. If fraudulent activity associated with the primary profile is detected, the primary profile may be deactivated in order to prevent further fraudulent activity. Utilizing the two-way communication features of the contactless card described herein, in some embodiments, a user is able to activate the secondary profile and continue using the same contactless card as a payment card without interruption. In some embodiments, the contactless card deletes any information associated with the primary profile when the secondary profile is activated. The user may continue to use the contactless card as a payment card while the financial institution issuing the card prepares a new contactless card and sends it to the user. The new contactless card may include information associated with the active secondary profile physically on the card and/or may contain information associated with a dormant alternative profile stored in the memory of the replacement card so that the user may activate the alternative profile if further fraudulent activity is detected at a later date.

In order to activate the secondary profile, a user may position the contactless card in close proximity to a client device in order to establish two-way communication between the card and the client device, such as, for example, a mobile phone. The client device may be in communication with a remote server associated with a financial institution. In some embodiments, an application may request an authentication token from the contactless card through the client device. Once the authentication token is provided by the contactless card, the application may provide instructions and/or information to the contactless card in order to activate the secondary profile.

When the user activates a secondary profile, information associated with the secondary profile may be displayed on the visual display. In some embodiments, the visual display utilizes e-ink or e-paper which require power to change the information displayed but do not require power to continue displaying the information once it has been updated. Such embodiments may function with or without a rechargeable battery as the visual display may be updated while the card is positioned within an NFC field.

In some embodiments, the visual display of the contactless card may be used to provide an additional security factor. Various programs, accounts, and/or log-in credentials may communication through an application with a client device. The user may be instructed to establish communication between a contactless card and the client device. The application may then request an authentication token from the contactless card through a client device in order to establish that the user is in physical possession of the contactless card and client device associated with the user. The application may transmit information to the contactless card through the client device, causing the visual display to display a security code. The user may be required to enter the security code as a form of additional authentication before the application allows the user access to certain information and/or feature.

In some embodiments, the memory of the contactless card may contain single-use or limited-use card numbers or authentication tokens. In such embodiments, an application may transfer a single use or limited use token to the contactless card while the card is in two-way communication with a client device. Such limited-use tokens may be used for promotional offers, security features, and/or loyalty programs. Additionally, applications may load applets onto a contactless card while the card is in communication with a client device. In some embodiments, a contactless card may transmit information to a client device and/or application associated with a client device and the client device may grant privileges based on the transmitted information. Applets may allow a single contactless card to be used for multiple different applications. For example, a single contactless card may be used as, but is not limited to being, an identification card, security card, access card, transportation card, payment card, loyalty program card, insurance card, membership card, debit card, credit card or any combination thereof. In some embodiments, a single contactless card may function as an access card for multiple separate access points, each access point requiring a separate authentication token. In some embodiments, a single contactless card may function as both a debit card and credit card with separate profiles associated with each account. Additionally, as a user creates a new account, closes an account, and/or modifies an account, the contactless card may be updated by establishing two-way communication with a client device, thereby allowing a single card to be used for an extended period of time and serve multiple purposes without replacing the physical card.

In some examples, once two-way communication has been established between the contactless card and client device, the contactless card transmits information to the client device and the client device auto-fills a form.

Figure 6:
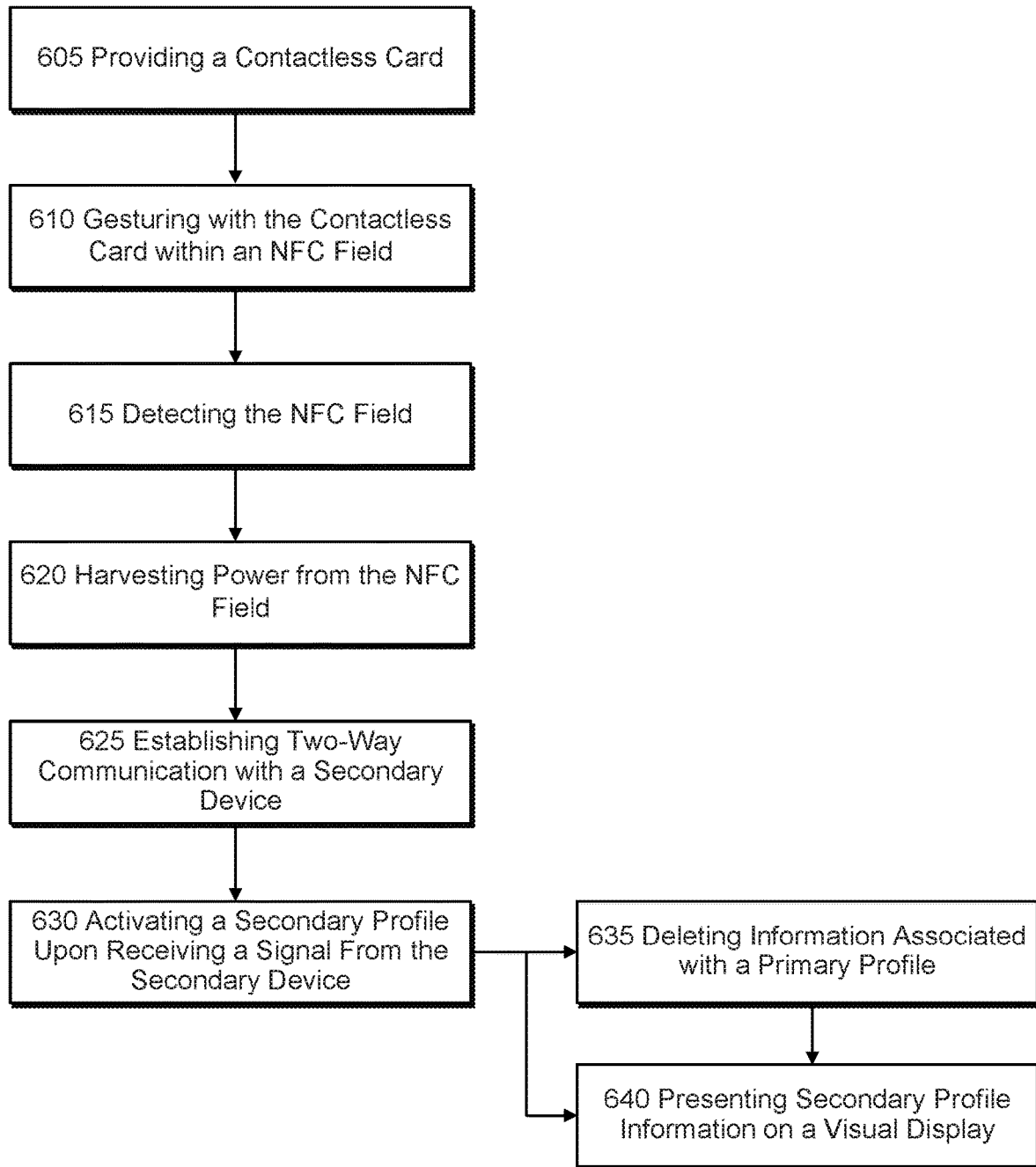
FIG. 6 illustrates a flow chart of a method of utilizing a contactless card according to an example embodiment.

FIG. 6 is a flow chart illustrating the operation of an exemplary embodiment of a contactless card. Method 600 may reference the same or similar components as illustrated in FIG. 1, FIG. 2, FIG. 3, FIG. 4A, FIG. 4B, and/or FIG. 5.

Method 600 may commence in step 605 with the provision of a contactless card, such as the contactless card described herein. As discussed, embodiments of the contactless card may comprise a processor, a non-volatile memory containing one or more applets, a communication interface, and a power harvesting unit. The power harvesting unit configured to harvest power from a near field communication (NFC) field generated by a secondary device and the communication interface is configured to transmit and receive radio signals. Step 610 comprises gesturing with the contactless card within the NFC field generated by the secondary device. The secondary device comprises a radio antenna and a NFC field generator and the secondary device is in communication with a server. In step 615, the contactless card detects the NFC field generated by the secondary device. In some embodiments, the card may indicate when it detects an NFC field using a visual display and/or indicator light. Step 620 comprises harvesting power, by the contactless card, from the NFC field generated by the secondary device. The contactless card is configured to use the power harvested from the NFC field to power the processor and other components such as, for example to communication circuit. Step 625 comprises establishing two-way communication between the contactless card and the secondary device.

In some embodiments of the disclosed method, the non-volatile memory contains a primary profile and a secondary profile. Once the card has established two-way communication with the secondary device, step 630 comprises the card activating the secondary profile upon receiving a signal from the secondary device. Optional step 635 comprises the card deleting information associated with the primary profile. Once the secondary profile has been activated, optional step 640 comprises the contactless card presenting information associated with the secondary profile on a visual display upon activating the secondary profile.

Figure 7:
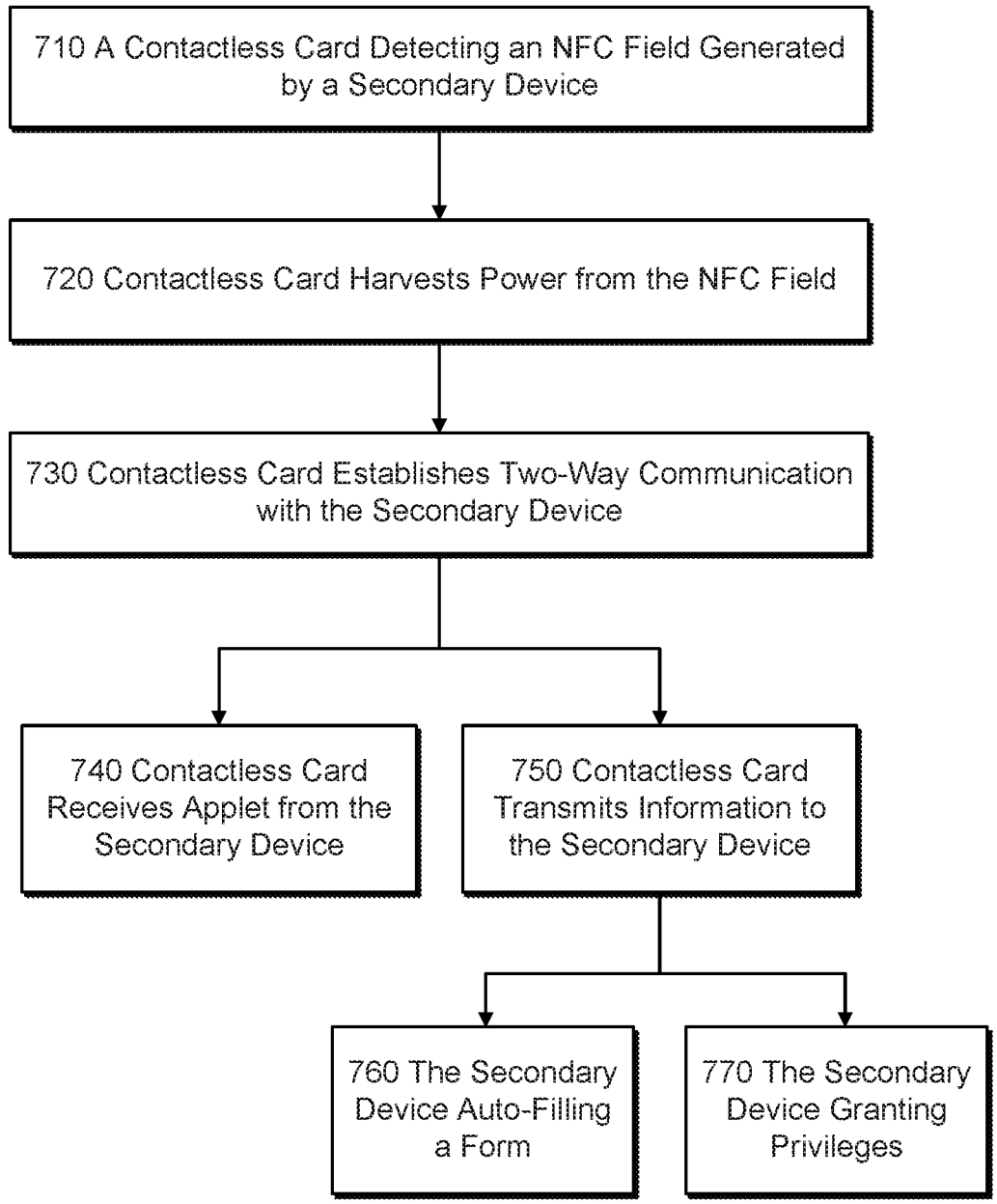
FIG. 7 illustrates a flow chart of a method of utilizing a contactless card according to an example embodiment.

FIG. 7 is a flow chart illustrating the operation of an exemplary embodiment of the contactless card. Method 700 may reference the same or similar components as illustrated in FIG. 1, FIG. 2, FIG. 3, FIG. 4A, FIG. 4B, FIG. 5 and/or FIG. 6. In step 710, a contactless card detects a NFC field being generated by a secondary device. Upon detecting an NFC field, the card may indicate the presence and/or strength of the NFC field using a visual display on the card and/or an indicator light. In step 720, the contactless card harvests power from the NFC field. The harvested power may be used to charge a rechargeable battery and/or capacitor and/or may be used to power a processor, memory, communication circuit, and/or other component of the contactless card. In step 730, the card establishes two-way communication with the secondary device. In some embodiments, the two-way communication is accomplished via a low energy radio signals, such as, for example, low energy Bluetooth signals.

Following the establishment of two-way communication, in step 740, the contactless card receives an applet from the secondary device. In some embodiments, the received applet allows access to a location or other privileges. In step 750, the contactless card transmits information to the secondary device. It will be understood that steps 740 and/or 750 may be performed individually and/or in any order after the contactless card has established two-way communication with a secondary device and are not dependent on each other.

In step 760, the secondary device auto-fills a form based on information transmitted to the secondary device from the contactless card. In step 770, the secondary device grants privileges based on the information transmitted from the contactless card to the secondary device. Similar to steps 740 and 750, it will be understood that steps 760 and/or 770 may be performed individually and/or in any order after the contactless card transmits information to the secondary device and are not dependent on each other.

In some examples, methods, processes, and procedures described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the contactless card, client device, and/or other computer hardware arrangements described herein.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain procedures, processes, and methods, as described herein above, for example.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A communication method performed by a contactless card comprising a processor, a communication interface, and a power harvesting unit, the method comprising:
    harvesting, by the power harvesting unit, power from a communication field generated by a secondary device; and
    limiting, by the processor, an amount of power supplied to the communication interface in order to limit a range of a signal generated by the communication interface to a pre-determined range.

2. The communication method of claim 1, further comprising:
    establishing communication between the contactless card and the secondary device; and
    receiving, from the secondary device, a received applet.

3. The communication method of claim 2, wherein the received applet provides access to a privilege.

4. The communication method of claim 3, wherein the access to a privilege comprises access to a location.

5. The communication method of claim 2, further comprising:
    establishing communication between the contactless card and the secondary device; and
    transmitting, to the secondary device, information.

6. The communication method of claim 5, wherein the transmitted information to auto-fills a form.

7. The communication method of claim 5, wherein the communication field is at least one selected from the group of a near field communication (NFC) field and a Bluetooth field.

8. The communication method of claim 5, further comprising:
    prior to establishing communication, detecting, by the contactless card, a strength of the communication field; and
    upon detecting that the communication field is of at least a predetermined strength, establishing communication.

9. The communication method of claim 1, further comprising:
    prior to limiting the amount of power supplied to the communication interface, detecting, by the processor, the communication field generated by the secondary device,
    wherein the communication field is a near field communication (NFC) field.

10. The communication method of claim 1, further comprising, prior to harvesting power by the processor, entering, by the contactless card, the communication field from the back of the secondary device.

11. A contactless card, comprising:
    a processor;
    a communication interface; and
    a power harvesting unit,
    wherein:
        the power harvesting unit to harvests power from a communication field generated by a secondary device, and
        the processor to limits an amount of power supplied to the communication interface in order to limit a range of a signal generated by the communication interface to a pre-determined range.

12. The contactless card of claim 11, further comprising a battery electrically connected to at least one selected from the group of the power harvesting unit, the processor, and the communication interface.

13. The contactless card of claim 12, wherein the battery, when the contactless card is outside of the communication field, supplies power to at least one selected from the group of the power harvesting unit, the processor, and the communication interface.

14. The contactless card of claim 12, further comprising a volatile memory electrically connected to the battery.

15. The contactless card of claim 11, further comprising:
    a first capacitor electrically connected to the power harvesting unit,
    wherein the first capacitor to rapidly charges and rapidly discharges.

16. The contactless card of claim 15, further comprising:
    a second capacitor electrically connected to the power harvesting unit,
    wherein the second capacitor slowly charges and slowly discharges.

17. The contactless card of claim 16, wherein the second capacitor can hold a charge for a longer period of time than the first capacitor.

18. A non-transitory computer-accessible medium containing instructions that, when executed by a computer hardware arrangement comprising a processor, a communication interface, and a power harvesting unit, cause the computer hardware arrangement to perform procedures comprising:
    harvesting, by the power harvesting unit, power from a communication field generated by a secondary device; and
    limiting, by the processor, an amount of power supplied to the communication interface in order to limit a range of a signal generated by the communication interface to a pre-determined range.

19. The non-transitory computer-accessible medium of claim 18, the procedures further comprising:
    establishing communication between the contactless card and the secondary device; and
    receiving, from the secondary device, a received applet, wherein the received applet grants a privilege provides access to a privilege.

20. The non-transitory computer-accessible medium of claim 19, wherein:
- the computer hardware arrangement further comprises a capacitor, and
- the procedures further comprise buffering, by the capacitor, the harvested power during a fluctuation of the communication field.

\* \* \* \* \*